Nov. 28, 1933.      A. W. ZITZMAN      1,936,816
CONFECTION SUPPORT AND TOY
Filed March 15, 1932
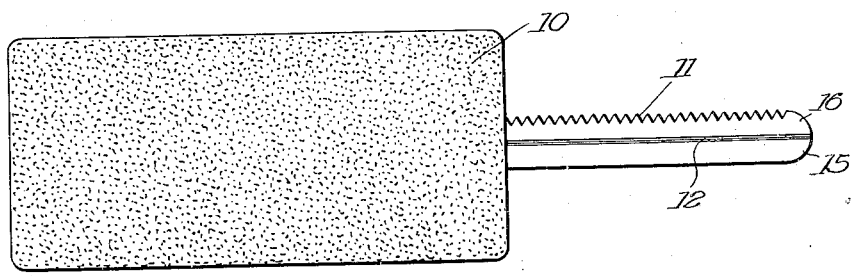
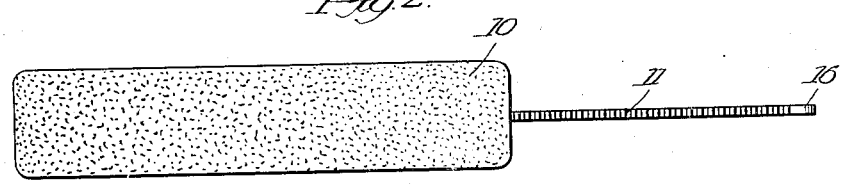
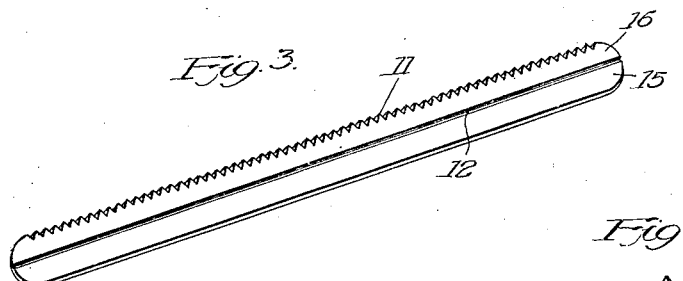
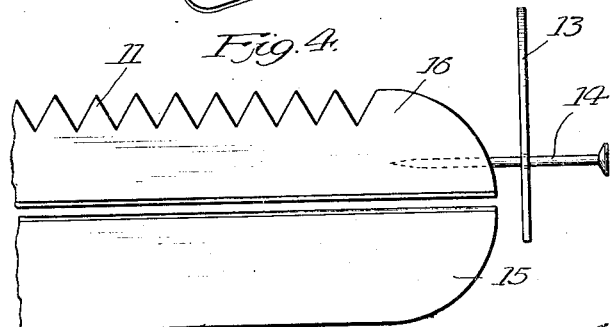
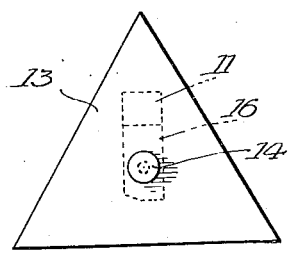
Witness:
R. B. Davison
Inventor:
Adolph W. Zitzman
By Murray & Murray
Attys.

Patented Nov. 28, 1933

1,936,816

UNITED STATES PATENT OFFICE 1,936,816

CONFECTION SUPPORT AND TOY

Adolph W. Zitzman, Chicago, Ill.

Application March 15, 1932. Serial No. 598,946

3 Claims. (Cl. 46—14)

My invention relates to candy bar sticks adapted to function in a novel manner in that use and further adapted for use as a toy when the candy has been consumed.

Large quantities of confections are manufactured in small bars mounted on a wooden stick, the projecting portion of the stick serving as a hand hold while the confection is being eaten; thereafter the stick is discarded. I have conceived and applied the idea of so constructing the stick that it functions to better advantage as a support for the candy bar and also may be used as a toy when the candy has been eaten.

To that end I so notch or serrate the stick that a better grip is provided either for the candy on the stick or for the hand on the projecting portion thereof. After the candy has been eaten a spinner is attached to the end of the stick and the spinner is caused to rotate rapidly by reciprocating a pencil or similar object over the notched edge of the stick. A simple method for providing the necessary object for cooperation with the notched stick is to score or weaken the confection support along a longitudinal line to enable it to be easily separated into two parts, each having the respectively described function.

The invention will be more readily understood by reference to the accompanying drawing, in which:

Figs. 1 and 2 are side and edge views respectively of a candy bar mounted on a support constructed in accordance with my invention;

Fig. 3 is a perspective view of the support or stick;

Fig. 4 is an enlarged fragmental portion of the end of the stick showing the two parts separated and also showing the spinner in place;

Fig. 5 is an end view of the notched stick with the spinner in place, and

Fig. 6 is a view of a modified form of the construction.

In the drawing I have shown a candy bar 10 formed over a portion of a stick or support, the projecting portion of the stick serving as a handle to be grasped while the confection is being eaten. The stick is preferably constructed of wood and has one edge notched or serrated as at 11 throughout all or a portion of its length. This serves to increase the bond of attachment between the candy and the stick and also provides a better grip for the hand on the exposed portion of the stick. The stick is scored or weakened as at 12 to permit it to be readily separated into two parts, as shown in Fig. 4, after the stick has performed its function as a support for the confection. Its use as a toy. after separation is best illustrated in Figs. 4 and 5. A spinner 13 is mounted for rotation on a pin 14 forced into the end of the notched portion of the stick. By using the detached portion 15 of the stick as an operating member and rapidly reciprocating it over the notched portion of the part 16, the spinner will be caused to rotate rapidly. By holding the operating member at another angle, while reciprocating it as described, the direction of rotation of the spinner will be reversed. It thus forms an interesting toy or plaything for children who are the principal users of the described confection.

In Fig. 6 I have shown another form of support or stick, being a round wood member 17 having notches 18 thereon formed by cutting a coarse thread on the round surface. This may extend throughout part or all of the length of the member as desired; but in any event the notched surface will facilitate the mounting and handling of the candy bar. This stick is not adapted to be separated into parts, it being assumed that when the spinner has been attached it will be operated by a pencil or some similar instrument that may be reciprocated over the notched portion.

It is obvious that the support or stick may take numerous other forms than those shown and I do not wish to be limited except as indicated in the appended claims.

I claim:

1. A relatively flat stick having notches along an edge and being weakened along a longitudinal line to permit it to be separated into two parts, and a spinner adapted to be rotatably attached to the end of the notched portion for operation by cooperation of the separated portion of the stick with the notched edge of the remaining portion.

2. A length of flat material having notches along one edge and weakened along a longitudinal line to enable its being easily separated into two parts, a spinner mounted on the end of the notched portion, the separated portion being adapted for cooperation with the notched edge to effect rotation of the spinner.

3. A length of material having notches along one edge and weakened at one point to enable its being readily separated into two parts, means formed on the material and over at least a portion of the weakened area and acting to reinforce the weakened area to prevent premature separation of the two parts, said means being adapted to be removed before the material is separated into its two parts, a spinner for mounting on the notched portion, the separated portion being adapted for cooperation with the notched edge to effect rotation of the spinner.

ADOLPH W. ZITZMAN.